Dec. 7, 1948.  H. R. FISCHER ET AL  2,455,747
VALVE CONTROL FOR FLUID LEVELS
IN HYDRAULIC POWER PLANTS
Original Filed Nov. 18, 1939  4 Sheets-Sheet 1

INVENTORS:
Howard R. Fischer
Edward W. Stevens
BY
Raymond G. Mullee
ATTORNEY.

Patented Dec. 7, 1948

2,455,747

UNITED STATES PATENT OFFICE 2,455,747

VALVE CONTROL FOR FLUID LEVELS IN HYDRAULIC POWER PLANTS

Howard R. Fischer and Edward W. Stevens, Detroit, Mich., assignors to Chicago Pneumatic Tool Company, New York, N. Y., a corporation of New Jersey Original application November 18, 1939, Serial No. 305,204, now Patent No. 2,365,536, dated December 19, 1944. Divided and this application October 21, 1944, Serial No. 559,762

8 Claims. (Cl. 60—51)

The present application is a division of the copending application Serial No. 305,204 filed November 18, 1939, now Patent No. 2,365,536, issued December 19, 1944.

This invention relates generally to compression riveting and more particularly to a hydraulic control mechanism for a portable power generating unit adapted to have one or a plurality of riveting units attached thereto.

According to a feature of the present invention, the power generating unit comprises, in addition to the hydraulic system for effecting operation of the riveting unit, a valvular controlled compressed air system for actuating the hydraulic system.

The principal object of the invention is to produce a hydraulic valve mechanism such as an equalizing float valve forming part of a small compact riveting assembly that is completely automatic in its operation.

Numerous features of novelty are embodied in the machine some of which are:

1. A compressed air distributing system by which the several steps of a riveting operation are controlled automatically, and which automatically terminates a cycle of operation;

2. Automatic means, capable of operation prior to the release of the manipulative trigger, for returning the power and riveting pistons to normal position, thereby speeding up operations in which a number of rivets are headed in rapid succession; and 3. Control mechanism associated with the hydraulic system for maintaining automatically a proper balance of oil in the various sections of the system.

Other objects of the invention, additional features of novelty, and structural details of the machine will be more apparent from the following description when read in conjunction with the accompanying drawings wherein:

Figure 1:
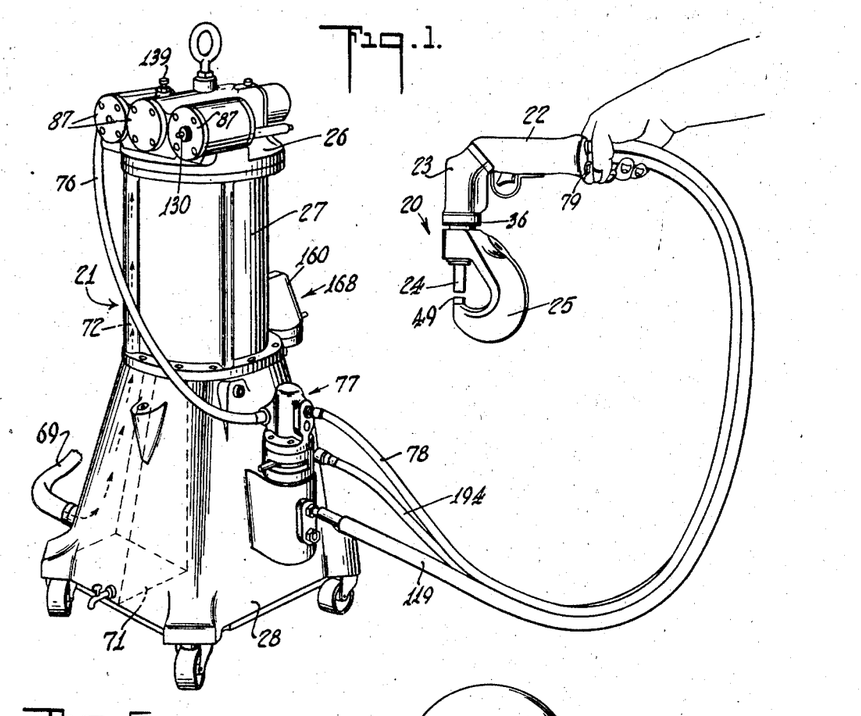
Fig. 1 is a view, in perspective, of the power generating unit and riveting unit completely assembled and ready for operation.

The machine is shown in Fig. 1 completely assembled and ready for operation. The riveting unit and the power generating unit are indicated generally therein by the respective numerals 20 and 21. The riveting unit 20 is connected to the power unit 21 by a plurality of pressure fluid conducting hose lines and is adapted for manual manipulation, independently of the power unit, anywhere within the range of the hose lines. Each unit 20 and 21 is a complete assembly in itself but is formed of several cooperating sections or sub-units, each detachable from the other, to facilitate assembly and replacement, or servicing. The riveting unit 20 comprises, broadly, a handle 22, a cylinder 23, a piston assembly including a piston rod 24, and a yoke 25. The several sections of the power unit include a head 26, in which the principal control valves are mounted, an intermediate section comprising the main compression cylinder 27, and a base section 28 in which is formed the oil reservoirs, pressure outlets and other elements and mechanisms to be described later with greater particularity. The power unit is mounted upon casters 29 to permit the unit to be moved easily from one working point to another.

In constructing this machine advantage has been taken of all known mechanical expedients to insure a maximum of efficiency in its operation. In the specification therefore, no specific mention is made ordinarily of elements such as piston rings or seals, gaskets, and the like, but it should be understood that these elements are provided in the machine, wherever necessary.

Considering first the riveting unit 20 and referring to Fig. 1, the handle 22 is secured to a portion integral with cylinder 23 and extending therefrom at an angle of about 45 degrees relative to the axis of the main part of the cylinder. The handle 22 and cylinder 23 are secured together by means of screws (not shown), while a piston rod 24 extends downwardly through a bushing or cylinder extension 36 screwed into the lower end of the cylinder 23 and overlies anvil head 49 on yoke 25. Extension 36 projects below the cylinder 23 and the projecting portion thereof passes through the upper end of the yoke 25 to form an effective connection between the extension and the yoke.

Figures 6, 7:
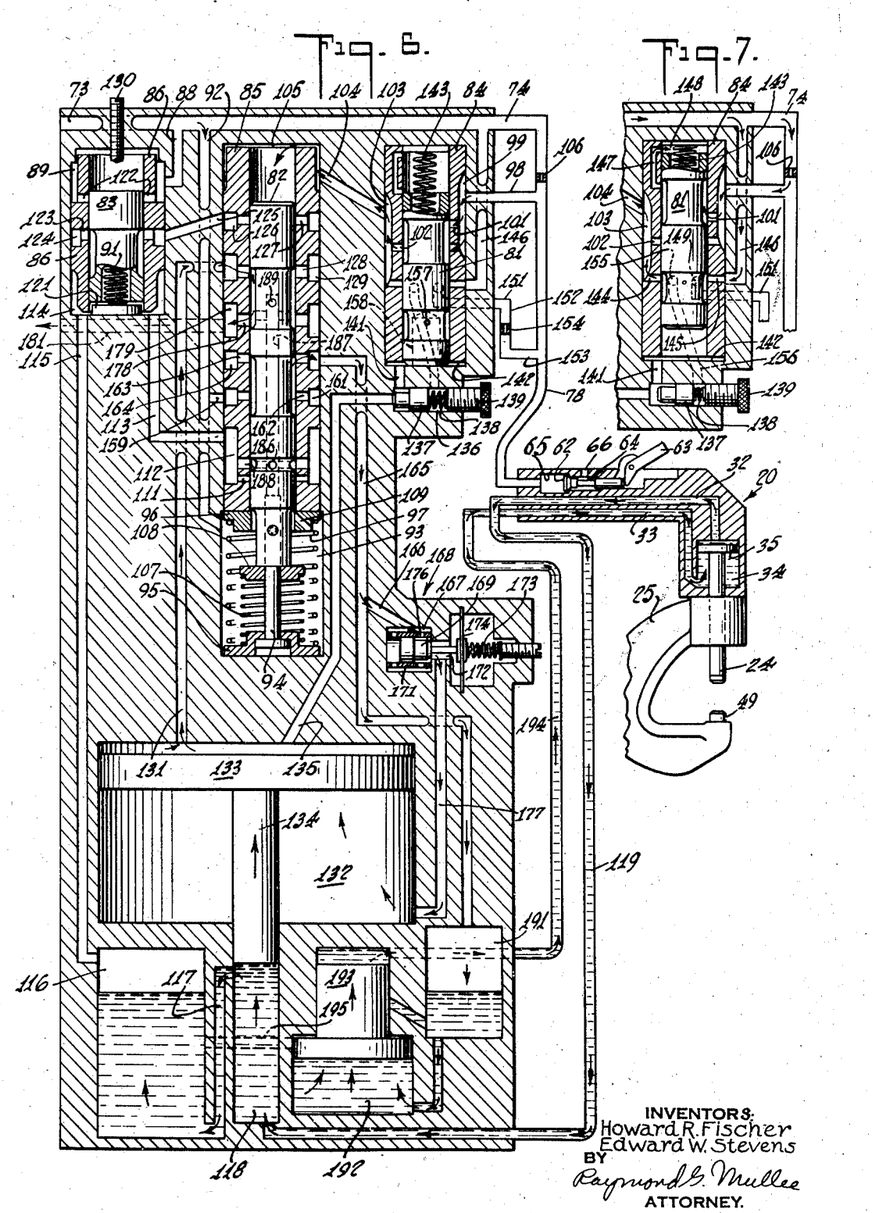
Fig. 6 is a diagrammatic view and illustrates the machine in its normal position.
Fig. 7 is a diagrammatic detail view of the return valve in actuated position.

Referring more particularly to the diagrammatic form of the apparatus shown in Fig. 6, within the handle 33 is mounted the throttle control mechanism comprising a throttle valve 62 and a control lever or trigger 63 for operating the valve. The valve 62 is movable within a bore 64, positioned within a counterbore 65 to which live pressure fluid such as compressed air is directed by means later to be described. The bore 64 is open to atmosphere through a port 66 formed therein and the valve 62 controls the flow of air from the counterbore 65, through the bore 64 and out the port 66. The valve 62 is preferably urged to closed position by a spring (not shown) and normally prevents the escape of air from the counterbore 65. The throttle control trigger 63 is pivoted to an inner surface of the handle 22 and is adapted to engage the rearmost end of the valve 62. A clockwise movement of the trigger 63, of Fig. 6, serves to move the valve 62 to opened position. With the valve 62 in opened position, air is permitted to pass from the counterbore 65 through the bore 64 and out the port 66 to atmosphere. This escape of pressure fluid occasions a drop in line pressure in the power generating unit which, in a manner later to be described, conditions the machine for a cycle of operation. In Fig. 6, the valve 62 and trigger 63 are shown in normal position.

As shown in Fig. 1, a hose line 69 is connected to the base 28 of the power unit 21. Compressed air, generated by means not shown herein, is introduced through the hose line 69 into a chamber 71 formed in the base 28. From the chamber 71 the air passes upward through a passage 72 in cylinder casing 27 and into the head section 26 through an inlet 73 (Fig. 6). Inlet 73 opens into a longitudinal main air passage 74 in head 26 and extending into the main air passage is a hose coupling (not shown) to which is attached an intermediate throttle hose 76 (Fig. 1). As shown in said Fig. 1 the hose 76 extends downward and into a two way valve assembly 77, later to be described. Extending from the valve assembly 77 is a main throttle hose 78 connected to the previously mentioned counterbore 65 formed in riveter handle 22. The line pressure of main air passage 74 is thus maintained, normally, also in counterbore 65.

Referring to Fig. 6 constituting the diagrammatic view, it will be seen that the several control valves mounted in the head 26 comprise an automatic return valve 81, a distributing valve 82 and a prefill valve 83, so named for reasons which will hereinafter more clearly appear. These valves are movable within respective cylindrical bushings 84, 85 and 86, each of which is open at both ends in order that air may be introduced therein above and below its respective valve. Each assembly comprising a valve and valve bushing is mounted in a respective bore in head 26, the opposite ends of each bore being closed by closure plates 87 (Fig. 2) appropriately formed to enclose the ends of the valve bushings and to permit freedom of movement of the valves.

The valves 81, 82 and 83 are controlled by individual springs and by pressure fluid supplied either directly or indirectly from air passage 74. Referring to Fig. 6, wherein the valves are shown in normal position, it will be seen that air is supplied directly to the upper end of prefill valve 83 through a port 88 connecting passage 74 and a chamber 89 formed about the upper reduced portion of prefill valve bushing 86. The valve 83 is thus normally held downward, against the resistance of a compression spring 91, by line pressure acting on the upper end of the valve; it being understood that expressions such as "upper" and "downward," when used in this part of the description, refer to the positions illustrated diagrammatically in said Fig. 6. Air is supplied directly also to the lower end of distributing valve 82 by means of a passage 92 leading from main air passage 74 into a chamber 93 formed within the closure plate 87 which encloses this end of the valve (see Fig. 2). A downwardly extending rod 94 is secured to the lower end of the valve 82 and supports a collar 95 at its lower end. Compressed between the collar 95 and an abutment 96, secured to the lower end of bushing 85, is a spring 97 which by reason of its arrangement urges the valve 82 downward, to the position shown in Fig. 6. Normally, line pressure is acting also on the upper end of valve 82, thereby balancing the pressure below the valve, and the spring 97 is free to hold the valve downward in the position shown. If the air pressure above the valve 82 is reduced below line pressure, the valve will be forced upward, against the resistance of compression spring 97, a distance determined by the extent of the reduction of pressure above the valve. Air is directed to the upper end of distributing valve 82 through a series of ports and passageways controlled by the automatic return valve 81. A port 98 connects the main air passage 74 to a groove 99 cut longitudinally in the outer surface of return valve bushing 84. The air passes from groove 99 through a pair of ports 101 in the bushing 84, around a reduced portion of valve 81 and through a port 102, formed in the opposite side of the bushing, into a second bushing groove 103. A passage 104 connects the groove 103 to a chamber 105 formed about the upper reduced portion of valve bushing 85 and thus, in the normal position of the parts, line pressure is supplied constantly to the chamber 105.

A metering orifice 106 is positioned within the air passage 74 intermediate the main inlet 73 and hose coupling 75 so that the unseating of throttle control valve 62, in riveting unit 20, causes an immediate drop in pressure in the line between metering orifice 106 and counterbore 65, since the air cannot pass through the orifice 106 as rapidly as it escapes through port 66. The extent of pressure reduction in this line is determined by the extent of actuation given the trigger 63. Port 98 communicates with air passage 74 at a point within the area of reduced pressure so that the drop in pressure occasioned by operation of the trigger 63 is reflected also in the ports and passageways leading to chamber 105, above valve 82, and in the chamber itself.

In initiating a cycle of machine operation the trigger 63 may be fully actuated in a single motion or it may be momentarily held in a partially actuated position before completing the full stroke. Since a riveting operation consists of a first stage, in which the rivet is set, and a second stage, in which the rivet is headed, the operation of the machine will be described as consisting of separate stages, the first of which is initiated by a movement of the trigger 63 through a portion of its stroke and the second upon the completion of the trigger stroke.

When the trigger 63 is moved to an initial position intermediate its normal and fully actuated positions, the reduction of pressure within chamber 105 will cause the valve 82 to move a short distance upward where it is held by a second compression spring 107 placed between an abutment collar 108 engaging the lower end of the valve, and the previously mentioned collar or spring base 95. In the normal position of the valve 82 the spring 107 is without effect since no relative movement between the valve and the collar 108 is possible until the collar engages the abutment 96. This occurs upon completion of the initial upward movement of the valve 82 and it will be evident that further upward movement of the valve must be accomplished against the combined action of springs 97 and 107. If the valve 82 is in the intermediate position, the live air acting upon the lower end of the valve is permitted to pass through a port 109 in abutment collar 96, around the reduced lower end of the valve and through a pair of ports 111 into an annular groove 112 formed in the outer surface of the bushing 85. A passageway 113 leads from the groove 112 to a chamber 114 formed around the reduced lower end of prefill valve bushing 86 so that upon the initial movement of distributing valve 82 line pressure is established in chamber 114. Extending from the chamber 114 is a passageway 115 which leads downward through the intermediate section of the unit to the base and opens into a prefill reservoir 116 containing a suitable liquid, such as oil. Live air pressure acting upon the oil in reservoir 116 forces the oil through a passageway 117 into a pressure chamber 118 and thence through means, including a hose line 119, to handle 22 of riveting unit 20. In handle 22 the oil is driven into the upper end of piston chamber 34, forcing piston head 35 and rod 24 downward to set the rivet. The hydraulic system is actuated at this time solely by air pressure within the reservoir 116 so that the pressure obtained in pressure chamber 34 is relatively small and insufficient to actually head the rivet.

Returning now to a consideration of the prefill valve 83 it will be observed that while air is passing from chamber 114 down to the reservoir 116, air is also seeping slowly between the inner edges of bushing 86 and a projection 121 of slightly less diameter than that represented by the inner edges of the bushing. Thus, while the rivet setting operation is in progress, pressure gradually builds up below the prefill valve 83 and, as the gradually increasing pressure counterbalances the line pressure acting on top of the valve, the spring 91 moves the valve upward. The upward movement of the valve 83 is further retarded by reasons of the fact that the air, above the valve, can escape only through a narrow opening between the upper end of the valve bushing and the closure plate 87, similar to the opening between the lower end of the bushing and projection 121. If valve 83 occupies an intermediate partly operated position, its upper end still closes a pair of ports 122 communicating with the upper chamber 89 which receives line pressure through port 88 directly from the main air passage 74. When the prefill valve has moved upward a slightly further distance, it will uncover the ports 122, allowing air to flow through the ports around a reduced portion of the valve and through another pair of ports 123 into an annular groove 124 formed in the bushing 86. The groove 124 is connected, by means of a passage 125, to an annular groove 126 formed in the distributing valve bushing 85. The groove 126 communicates with the interior of the bushing 85 through a set of ports 127 which are closed by the head of the distributing valve in its normal and intermediate positions.

When operating the control trigger 63 in two steps the second step, to fully actuated position, is performed after the rivet setting stage of the operation and may take place before or after the ports 122 are uncovered by the prefill valve. Upon the trigger 63 being fully actuated with the throttle control valve 62 completely open, the drop in pressure between the riveting unit and the metering orifice 106 will be considerable, and, as reflected in chamber 105 above the distributing valve 82, will be sufficient to permit the valve 82 to be moved to its extreme upward position against the compression of the two springs 97 and 107. This movement of the valve 82 from its intermediate position to fully operated position serves to uncover the ports 127 and permit air to flow through the ports around a reduced portion of the valve and through a second set of ports 128 into another annular groove 129, formed in the bushing 85. Communicating with the groove 129 is a passageway 131 which extends downward and opens into a main compression chamber 132 containing a piston assembly including a piston head 133 and rod 134. Normally, and during the rivet setting stage of operation, the piston assembly in chamber 132 occupies the normal position shown in Fig. 6. However, upon the extreme upward movement of the distributing valve, line pressure passing through the above described ports and passageways enters the upper end of chamber 132 and drives the piston assembly downward.

Piston rod 134 extends downward into the oil pressure chamber 118 and, in moving through the chamber, forces oil at great pressure through the passageways leading into riveting piston chamber 34 to drive the riveting piston assembly downward and complete the rivet heading operation. If, for any reason, it should be desired to prolong the rivet heading operation beyond the normal time in which this operation is performed, a means is provided for reducing the flow of air to the chamber 132 to increase the time required to build up sufficient pressure therein to operate the piston assembly. This means resides in a set screw 130 adapted to engage the upper end of the prefill valve 83 to limit the upward movement of the valve. As shown in said Fig. 6, the screw 130 extends through the upper end of prefill valve bushing 86 and may be manually set to any desired position of adjustment. When the valve 83 is prevented from completing its upward movement, the ports 122, controlled by the valve, are only partially opened and the flow of air through the ports is accordingly reduced.

The rivet heading operation being now complete, the trigger 63 may be released. Upon release of the trigger, the air in the passageway 78 between the riveting unit and the metering orifice 106 will build up to line pressure and this pressure can be used to return the distributing valve 82 to its normal position, thereby cutting off the flow of air to the main compression chamber 132 and prefill reservoir 116. However, an automatic control means, which acts independently of the trigger 63, is provided for returning the valve 82 when a predetermined point of peak pressure is reached in the chamber 132. In this connection, a second passageway 135 opens into the upper end of the chamber 132 and extends upward into a bore 136 and within the latter is a valve 137 which normally closes the passageway 135 and is urged to closed position by a spring 138. An adjusting screw 139 also extends into the bore 136 and acts upon the spring 138 to increase or lessen the pressure with which it urges valve 137 to closed position. Thus, when the pressure in chamber 132 reaches a sufficiently high point to force valve 137 off its seat, air is permitted to pass from the chamber into the bore 136 and from there through a passage 141 into a chamber 142 below the automatic return valve 81. The pressure fluid thus introduced into chamber 142 immediately forces the valve 81 upwards, against the resistance of a compression spring 143, into the position shown in Fig. 7. As shown in the latter figure, the valve, when in its upper position, closes the port 102, leading into groove 103, but establishes communication between this groove and the interior of the bushing 84 through another port 144. Also formed in the bushing 84, opposite the port 144 and opened by upward movement of the valve, is a port 145 communicating with a passageway 146 leading directly from the main air passage 74. The passageway 146 opens into the main air passage at a point between the air inlet 73 and metering orifice 106 so that full line pressure may pass through passageway 146 and port 145 around a lower reduced portion of valve 81 and then through port 144 into groove 103. From groove 103 the air flows, of course, through passage 104 into chamber 105 above the distributing valve 82, forcing this valve downward to the normal position of Fig. 6 and thereby closing ports 127 and 111 to stop the flow of pressure fluid to chambers 132 and 116 respectively.

Still referring to Fig. 7, it will be seen that the air of reduced pressure below the metering orifice 106 flows from groove 99 in bushing 84 through the upper one of the ports 101, around the upper reduced portion of the valve 81 and then through a passage 147, formed in the bushing, into a chamber 148 above the valve. As the air in chamber 148 builds up to a sufficient pressure to balance the pressure acting upon the lower end of the valve, the spring 143 returns the valve downward to its normal position. This occurs upon the closing of the throttle valve 62.

In order to speed up the return action of the valve 81, an auxiliary return connection may be provided. The bushing 84 is formed with a port 149, normally closed by the valve 81, communicating with a passage 151 leading into an opening 152 (Figs. 6 and 7) from which extends another passage 153 opening into the main air passage 74 below the metering orifice 106. Upon upward movement of the valve 81, the lower reduced portion thereof is placed opposite the port 149 and line pressure passing around this reduced portion from port 145 is admitted through the port 149 to passages 151 and 153. A metering orifice 154 is positioned in the opening 152 (Fig. 6) and delivers, at a restricted rate, compressed air into passage 153 and hose 78, thereby complementing the action of orifice 106.

It is also desirable, for quick and efficient operation of the machine, that the relief valve 137 be returned to its seat immediately after it has performed the function of causing the operation of valve 81 to the Fig. 7 position. To insure prompt action of valve 137, line pressure, when admitted through port 149 in bushing 84, is also admitted through a similarly formed port 155 (Fig. 7) to a passageway 156 leading into the bore 136 at a point to the rear of the valve 137. The combined action of the spring 138 and air at line pressure thus produces an ample force for the return of the relief valve, and chamber 142, below the valve 81, is positively cut off from the chamber 132.

In order that the valve 81 may be retained in its upper, or actuated position, for the time necessary to accomplish the return of the distributing valve 82, a small opening 157 (Fig. 6) is formed in the lower reduced portion of the valve 81 which communicates with a bore 158 drilled in the lower end of the valve. Pressure fluid from port 145 thus passes also through the opening 157 and bore 158 into the chamber 142 and acts upon the lower end of the valve 81. After the closing of relief valve 137 air is supplied to the chamber 142 only through the opening 157.

If, and as long as, the operator, subsequent to the completion of the rivet heading stroke of pistons 133 and 35, continues to hold the throttle valve 62 open, the automatic return valve 81 will be held in its upper or operated position illustrated in Fig. 7 by the preponderance of the pressure of substantially live air, delivered through opening 157 and bore 158, over the opposing combined pressures of spring 143 and fluid under reduced pressure. Under these conditions such reduced pressure, in hose 78 and associated passages, does not initiate a new cycle of operation as before, because the automatic return valve 81 is now positioned to deliver live air through passage 104 to the upper end of distributing valve 82. Upon release of throttle valve 62 to closed position, air pressure in hose 78 builds up to line pressure to balance the fluid pressures at the ends of valve 81 and permit the spring 143 to restore it to the normal (Fig. 6) position. The auxiliary passage 153, associated with metering orifice 154, performs an important, though not indispensable, function in augmenting the rise in pressure in hose 78 with the consequent restoration of valve 81 to normal, following the close of throttle valve 62. The operator, therefore, may reopen the throttle valve to head a new rivet without any appreciable delay on account of the restoration of valve 81 subsequent to the closing of the throttle valve.

The return stroke of the main driving piston 133—134 begins immediately upon the return of the distributing valve 82 to normal. Since the driving piston encounters less resistance on its return than on its power stroke, reduced pressure may be used for its return, thereby effecting a saving in compressed air. As shown in Fig. 6, in the normal position of the valve 82 air, at line pressure, flows through a branch 159 of the passageway 92 into an annular groove 161 in distributing valve bushing 85. From groove 161, the air passes through a set of ports 162, around a reduced portion of the valve 82 and out a set of ports 163 into a second annular groove 164. A downwardly extending passageway 165 communicates with the groove 164 and a branch 166 of the passageway leads into a bore 167 formed in a projecting portion 160 of the cylinder 27 (see Fig. 2). Positioned within the bore 167 is a well-known type of reducing valve assembly 168, having a valve 169 movable within a bushing 171 to control the flow of air into passage 172. An adjustable spring 173 presses upon the lower surface of a diaphragm 174 to urge the valve 169 to open position while air entering the open upper end of bushing 171 acts upon the upper end of the valve to close it when the diaphragm is forced downward. The air flows into the upper end of bore 167, through a set of ports 176, in the bushing 171, and past the valve 169 to the passage 172 where it is directed to the lower end of bore 167 and out a passage 177. In passing from passage 172 to passage 177 the air acts on the upper surface of the diaphragm 174 and presses it downward against the tension of spring 173. The valve 169 is thus allowed to move downward to a partly closed position and, as a result, the pressure of the air passing from the lower end of bore 167 is substantially less than that of the air entering the upper end of the bore. The passage 177 opens into the lower end of compression chamber 132, below the piston head 133, and the air of reduced pressure thus introduced below the piston head serves to return the piston to its normal upper position.

Provision is made for directing air, trapped on either side of the piston head 133, to exhaust. Referring to Fig. 6, again it will be seen that during the upward travel of the piston 133—134, the air above the piston is forced out of the chamber through the passageway 131 and enters groove 129. From groove 129 the air passes through ports 128 around the upper reduced portion of valve 82 and out a pair of ports 178 into an annular groove 179 formed in the bushing 85. Communicating with groove 179 is a passageway 181 leading, in a manner not shown herein, to an exhaust chamber 182 (see Figs. 3 and 4) formed in the base 28. Extending into the chamber 182, through an opening in the base plate 180, is a muffler comprising a perforated retainer 183 filled with copper wool or a like substance. A closure plate 184 covers the lower end of the retainer 183 and exhaust air is permitted to pass through the retainer and out openings 185 in the plate 184, to atmosphere. During the downward movement of the piston 133—134, the distributing valve 82 is in its uppermost position and, as already discussed, the exhaust port 178 is then opposite a lower reduced portion of the valve and is thus in communication with the ports and passageways leading into the lower end of compression chamber 132. During this portion of the cycle, therefore, the air below the piston head 133 is driven to the exhaust chamber 182, via passages 177, 166, 165, etc.

It is also desirable that chamber 114, below the prefill valve 83, be connected to exhaust in the normal position of the machine in order that the oil in reservoir 116 may return to its normal level. Therefore, an opening 186 is formed in a grooved portion of the distributing valve 82 and communicating with the opening is a longitudinal bore 187 in the valve. In the normal position of the valve 82 (Fig. 6) the opening 186 therein lies opposite a pair of ports 188, in the bushing 85, which communicate with the previously mentioned annular groove 112. Exhaust air is then free to flow from chamber 114 through the connecting ports and passageways to opening 186 and then through longitudinal bore 187. At the upper end of bore 187 another opening 189 is formed in the valve 82 and the air from bore 187 passes out this opening, around the upper reduced portion of the valve and out the exhaust port 178.

Turning now to a further consideration of the hydraulic system it will be remembered that the initial movement of the oil takes place during the first or rivet setting stage of the cycle, when live air under the usual line pressure, say, 90 pounds per square inch, is admitted to the prefill reservoir 116. Then, during the second or rivet heading stage of the cycle, the main driving piston 133—134 is actuated and the oil ahead of the driving piston forces the riveting piston assembly downward to its operated position, with a pressure of several tons. In order that the riveting piston may be returned to its normal position after each rivet heading operation, oil is supplied through passageway 33, in the riveting unit, to the lower end of the pressure chamber 34 below the piston head 35. Referring again to Fig. 6, there is provided in the base section 28 of the power unit, a return oil reservoir 191 into the upper end of which opens the passageway 165. In the mentioned normal position of the distributing valve 82, air under line pressure flows through this passageway and thence through parallel branches to serve the dual purpose of returning the driving piston 133—134 and acting upon the oil in reservoir 191 to effect the return of the riveting piston. Reservoir 191 is in communication with an oil pressure chamber 192 in which is mounted a return piston 193. Upon the introduction of live air into the reservoir 191 the oil therein is forced downward into the pressure chamber 192 where it acts upon the base of the piston 193 to force it upwards. As the piston 193 moves upward, oil above it is forced through means including a hose line 194 to the riveting handle 22 where it is conducted by means of passageway 33 to the pressure chamber 34 where it returns the piston assembly therein to the normal position of Fig. 6. It will be recalled that in connection with the first discussed intermediate step of the distributing valve 82 toward actuated position, the ports 162, by which live air is conducted to the passageway 165, are closed and line pressure is hence cut off from the reservoir 191. Further, the passageway 165 is opened to exhaust at this time so that no air pressure opposes the riveting piston as it descends to its rivet setting and rivet heading positions. On the return stroke of the piston head 35 the oil above it retraces its path through passageway 32, hose 119, and back to the prefill reservoir 116, which is opened to exhaust at this time through chamber 114, below prefill valve 83. On the actuating stroke of piston head 35, the oil below it passes back through passageway 33, hose 194, and on to pressure chamber 192 where it assists in moving the piston 193 downward. The primary force in lowering the piston 193 is oil from the prefill reservoir 116, introduced through a connecting passageway 195 which opens into the pressure chamber 192 at a point above the head of the piston, both reservoirs 71 and 116 being disposed above the common bottom 196 of base 28.

Figures 2, 8, 9:
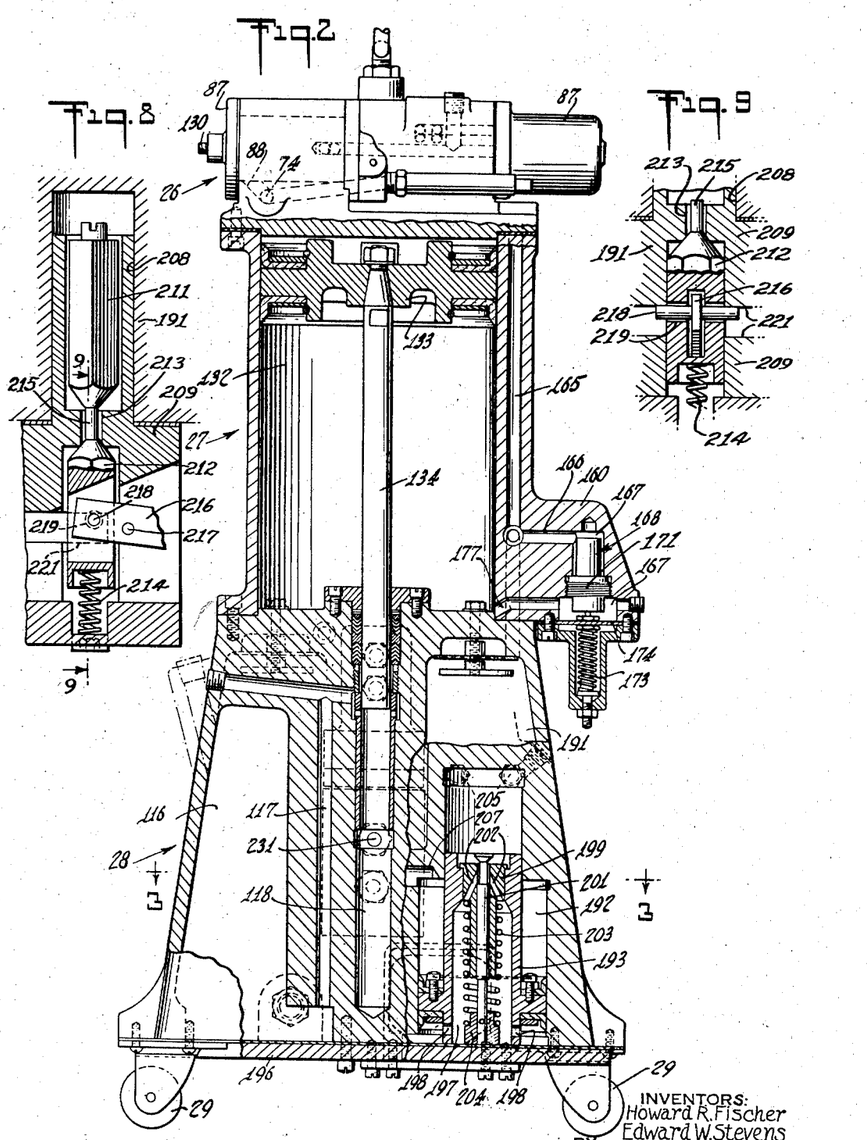
Fig. 2 is a view, partly in section and partly in elevation, of the power generating unit.
Fig. 8 is a fragmentary sectional view similar to Fig. 5 but on a larger scale, showing the upper and the lower valve for controlling the flow of oil between the reservoirs.
Fig. 9 is a view of the lower valve, chiefly in longitudinal section as indicated by the arrows 9 in Fig. 8, and on the same scale as the latter.
Figure 3:
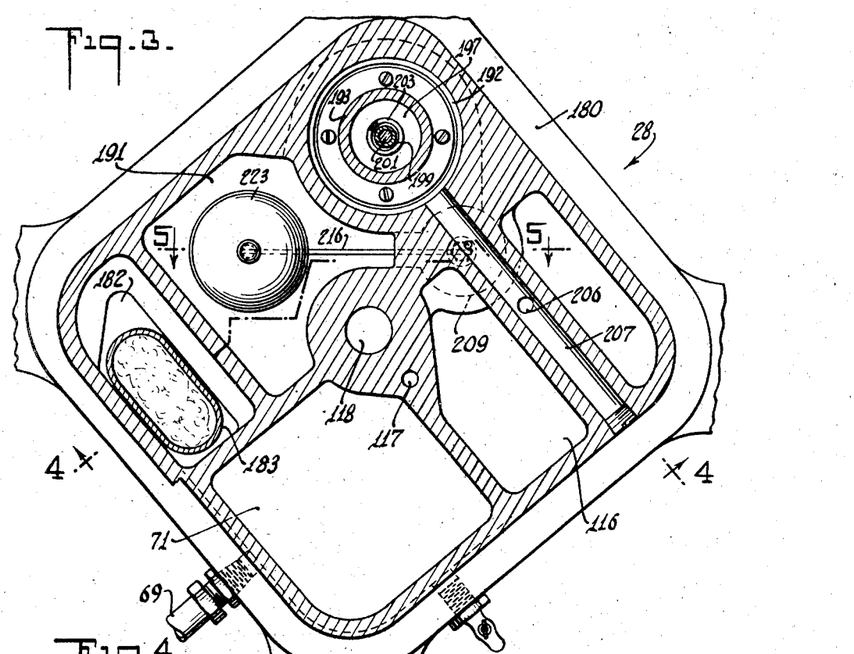
Fig. 3 is a view looking downward through the base of the power generating unit and is taken substantially along the line 3—3 of Fig. 2 or 4.

In order that a proper balance of oil may be maintained in the various sections of the hydraulic system certain valvular control mechanisms are provided. As shown in Figs. 2 and 3, the return reservoir 191 and pressure chamber 192 are separated by a wall of the base casting, which does not, however, quite reach the base plate 180 and so permits constant communication between the lower end of the reservoir and the lower end of the chamber. Referring particularly to Fig. 2, the piston 193 is formed with a bore 197 which extends throughout the length of the piston and communicates, through a pair of ports 198, with the lower end of chamber 192 below the head of the piston. Supported within the bore 197 is a bushing 199 in which is mounted a valve 201. The valve 201 is movable within the bushing 199 to open and close a pair of ports 202 by which communication is established between the bore 197 and the upper end of chamber 192 above the piston 193. The valve 201 is urged to closed position by a compression spring 203 extending between a shoulder of bushing 199 and an abutment collar 204 secured to the lower end of the valve; but, in the operated or downward position of the piston, the valve is held in open position by reason of the engagement of collar 204 with base plate 180. The operated position of the assembly is shown in Fig. 2 and it will be seen that, at this time, oil may pass from the upper end of the chamber 192 downward through the ports 202 into the bore 197 and out the ports 198 to the lower end of chamber 192 and to the reservoir 191. Then, when compressed air is admitted to the reservoir 191 to initiate a return stroke of the riveting piston, oil passes from the reservoir through the ports 198 into the bore 197 and out the ports 202 to the upper end of the chamber 192. When the upper end of the chamber is filled, the oil from the reservoir 191 acts upon the lower surface of the head of piston 193 and forces the piston upward. Upon the initial upward movement of the piston, the upper end of bushing 199 engages the head of valve 201; thus closing the ports 202, and during the subsequent upward movement of the piston the several elements 193, 199 and 201 move together as a unit and the valve remains in closed position. The oil above the piston 193 is forced out a passageway 205 which opens into the upper end of chamber 192 and connects, in a manner not shown herein, to the return oil hose 194 (Fig. 1).

Figure 4:
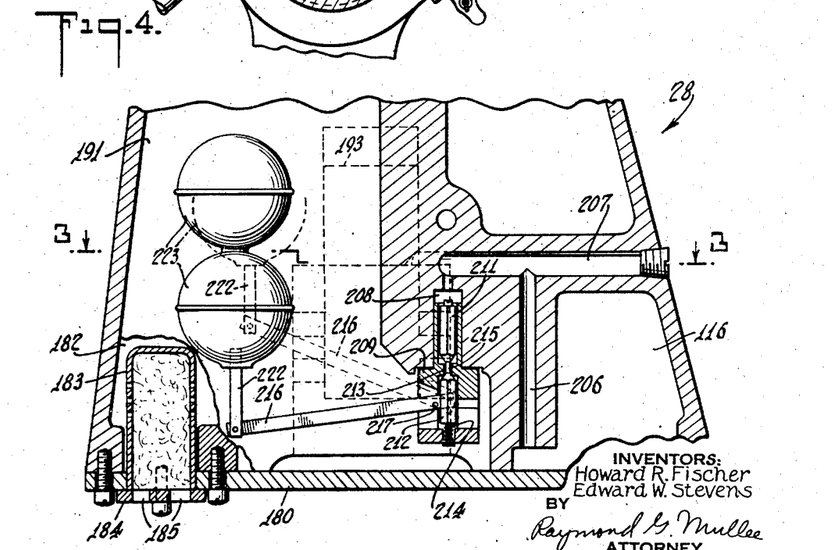
Fig. 4 is a sectional view taken substantially along the broken line 4—4 of Fig. 3.
Figure 5:
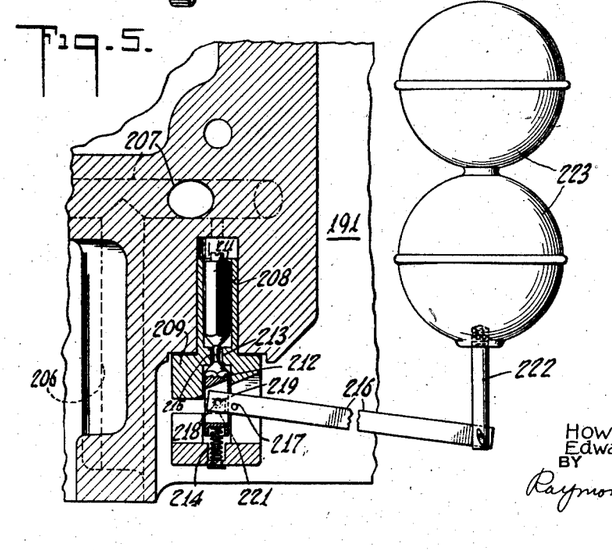
Fig. 5 is a detail view of a certain valve control mechanism which functions to maintain a proper balance of oil in the oil reservoirs looking in the direction of the arrows 5 in Fig. 3.

In the present hydraulic system, as in those of a similar class, a certain amount of oil seepage takes place about the piston head 35 in the chamber 34. In general, the seepage in one direction past the piston is counteracted by seepage in the opposite direction during a different part of the cycle but, as a practical matter, real equality of balance is rarely if ever attained. Thus, in the present instance, the amount of oil which seeps from the upper end of chamber 34 to its lower end during extended operation of the machine exceeds by a considerable amount the seepage which takes place during the same period in the opposite direction. Also, if the machine stands idle for a protracted period, with the air pressure turned on, oil will pass from the lower end of chamber 34 to the upper end and none at all return in the opposite direction. Excessive seepage in either direction past the piston head 35 will cause a variation in the normal level of the oil within return reservoir 191. Should this level go too high the oil may overflow into the air passages and if the level goes too low the supply therein may be insufficient to operate the return piston 193. Wide variations of the oil level in reservoir 191 are, therefore, undesirable and, in order to confine variations within narrow limits, certain additional control mechanism is provided in accordance with the present invention. As shown in Figs. 3, 4 and 5, the return reservoir 191 and the prefill reservoir 116 are connected by a pair of passageways 206 and 207, the latter of which is in communication with a bore 208 (Fig. 4) opening into the reservoir 191. The passageway 207 communicates also with the pressure chamber 192 (see Figs. 2 and 3) at a point above the head of piston 193, so that, during the prefill operation, oil passes from the reservoir 116 through the passageways 206 and 207 and acts to return the piston 193 downward. The previously mentioned passageway 195, shown in Fig. 6 is a diagrammatic representation of the connection effected by passageways 206 and 207, between the reservoir 116 and chamber 192.

Positioned within the bore 208 (Figs. 4, 5, 8 and 9) and extending below it into the reservoir 191 is a block 209 which acts as a bushing for a pair of oppositely disposed valves 211 and 212 which control the flow of oil through a narrow opening 213 in the block. The valves 211 and 212 are spaced slightly from the inner guide walls of the block 209 to permit the oil to pass around the valves to the opening 213. The valve 212 is urged upward to closed position by a spring 214 and is formed with a stem or extension 215 which passes through the opening 213 and underlies the lower end of valve 211. With valve 212 in upper or closed position, the extension 215 thereof engages the valve 211 and holds it off its seat in open position. As shown in Fig. 5 the mid-portions of the valve 212 and block 209 are slotted vertically to permit the passage of oil to and from the valve and to receive one end of a lever 216 pivoted at 217 to an inner wall of the block. The lever 216 bears, at its left hand end, as also viewed in Fig. 5, a laterally extending stud 218 which passes through an opening 219 in the valve 212 and projects into a horizontal slot 221 formed in the block 209. The valve 212 may thus be raised and lowered upon operation of the lever 216 which is movable about its pivot point 217 a distance limited to the range of movement permitted the stud 218 by the opposite edges of the slot 221. The right hand end of the lever 216, as viewed in Fig. 5, is pivotally connected to a rod 222 secured to the lower one of a pair of connected buoyant elements 223 which float on the surface of the oil in reservoir 191. The rise and fall of the oil in this reservoir is reflected, therefore, in a corresponding movement of the lever 216 and a consequent downward or upward movement of the valve 212.

When the oil level in reservoir 191 rises sufficiently to cause the opening of valve 212 and live air is thereupon introduced into reservoir 191, as previously described, oil will pass from the reservoir 191 through the opening 213 past valve 211 and through the passages 207 and 206 to the prefill reservoir 116, the pressure of the oil being sufficient to unseat valve 211. As the oil level thus drops in reservoir 191, the lever 216 is caused to move in a clockwise direction (Fig. 5) and valve 212 is urged by spring 214 to closed position in which position, the extension 215 thereof will maintain valve 211 off its seat. When live air pressure is then applied to the prefill reservoir, as previously described, oil from the prefill reservoir will pass downward through the opening 213 and around valve 212 into the return reservoir. In order that the valve 212 may be unseated at this time to an extent that will allow the passage of oil past it, it is permitted a slight movement or lost motion relatively to the lever 216. It will be noted that the opening 219 in the valve (Figs. 8 and 9), through which the stud 218 is passed, is of slightly greater diameter than the stud. The valve 212, when the lever has moved to its allowed limit in a clockwise direction, is held in its fully closed position by the spring 214 while the stud 218 is held a short distance below the upper edge of the opening 219 by reason of its engagement with the upper edge of the slot 221. But the valve 212, in response to the oil pressure from reservoir 116 and against the resistance of spring 214, will be moved downward a distance sufficient to permit oil to flow downward through the opening 213, even though the lever 216 and buoyant elements 223 be in their lowermost positions. The relative downward movement of the valve 212, at this time, is not enough, however, to permit the valve 211 to return to its seat. Valve 211 will close only when the buoyant elements 223 rise and pull valve 212 a further distance off its seat. In the interval before valve 211 closes, the desired amount of oil will flow from reservoir 116 to reservoir 191.

The exchange of oil between the prefill reservoir and the return reservoir thus takes place when compressed air is admitted to these respective chambers, and it will be noted that, by reason of the construction of the valves 211 and 212, an exchange of oil will take place during each cycle of machine operation. The valves 211 and 212 cannot occupy their seats at the same time and it is always possible to force oil in one direction or the other through the opening 213. When live air is admitted to prefill reservoir 116 during the rivet setting portion of the cycle, oil is forced past the valves 211 and 212 until the oil level in the return reservoir rises to a point where valve 212 will be pulled fully off its seat and valve 211 permitted to drop to closed position. Then when air under pressure is admitted to the return reservoir 191, during the piston return or normalizing portion of the cycle, oil is forced in the other direction past the valve 212, unseating valve 211, and continuing into the prefill reservoir until the oil level in the return reservoir drops sufficiently to permit valve 212 to move to fully closed position. If there is an excessive amount of oil in the return reservoir, the valve 212 remains open for a period longer than normal. If there is a lack of oil in the return reservoir, a correspondingly longer time is required to pull valve 212 off its seat, during the rivet setting stroke, and additional oil may flow from the prefill reservoir past the open valve 211.

For an easier understanding of the foregoing explanation of the valve mechanism, the following diagram will be helpful. The various positions of the essential parts of the valve mechanism and the levels of the reservoirs are shown, the cycle of operations being assumed to begin when the prefill reservoir is at high level and the return reservoir is at low level with the buoyant element and the outer end of the lever in down or lowered position.

| Stage | Float 223 | Stud 218 | Upper Valve 211 | Lower Valve 212 | Prefill Reservoir 116 | Return Reservoir 191 |
|---|---|---|---|---|---|---|
| 1 | D | U | O | C | H. L. | L. L. |
| 2 | D | U | I | I | H. L. | L. L. |
| 3 | R | L | L | L | L | R |
| 4 | U | D | C | O | L. L. | H. L. |
| 5 | U | D | C | C | L. L. | H. L. |
| 6 | L | R | O | R | R | L |
| 7 | D | U | O | C | H. L. | L. L. |

Symbols:
D—down
U—up
O—open
C—closed
H. L.—high level
L. L.—low level
R—rising
L—lowering
I—intermediate (position in which valve 212 is down to the extent permitted by the lost motion arrangement between stud 218 and opening 219).

*Stage 1.*—Instant air pressure is first applied to oil in prefill reservoir at the beginning of the rivet setting portion of the cycle (column 13, line 21 et seq.).

*Stage 2.*—Instant valve 212 is forced down against spring 214 to extent permitted by lost motion arrangement between opening 219 and stud 218.

*Stage 3.*—Period during which oil is passing from reservoir 116 to reservoir 191.

*Stage 4.*—Instant of completion of transfer of oil to reservoir 191.

*Stage 5.*—Instant air pressure is applied to oil in return reservoir at the beginning of the piston return or normalizing portion of cycle (column 13, line 27 et seq.).

*Stage 6.*—Period during which oil passes from reservoir 191 to reservoir 116.

*Stage 7.*—Instant of completion of transfer of oil to reservoir 116.

It has been previously described how the peak pressure obtainable in the compression chamber 132 may be varied by operation of the adjusting screw 139 (Figs. 6 and 7) to vary the pressure with which the relief valve 131 is urged to closed position. It is desirable to vary the peak pressure obtainable in the chamber 132 since, by this means, each riveting operation may be performed with a maximum of efficiency. In heading rivets of different size the screw 139 is set in accordance with the size of the rivet to raise or lower the air pressure within the chamber 132. It will be evident that by reason of this adjustable means a considerable saving of time and compressed air is effected. To assist the operator in determining the proper setting of the screw 139 for each size rivet a standard pressure gauge (not shown), may be affixed to the machine and caused to register the degree of pressure within the chamber 132.

While the invention has been described with particular reference to operation of a riveting machine, it is susceptible of operating machines for other uses, such as pressing, pulling, crushing, punching and embossing.

What is claimed is:

1. In a hydraulic system, the combination of a cylinder, a motor piston reciprocable therein, a pair of oil reservoirs in communication with the respective ends of said cylinder, means for applying air pressure in alternate ones of said reservoirs to actuate said piston, a passageway connecting said reservoirs independently of the cylinder, a buoyant element floating on the surface of the oil in one of said reservoirs, and means controlled by said buoyant element for controlling the flow of oil between said reservoirs, said means acting in one position of said element to prevent the flow of oil in one direction through said passageway and acting in another position of said element to prevent the flow of oil in the opposite direction through said passageway.

2. In a hydraulic system, the combination of a cylinder, a motor piston reciprocable therein, a pair of oil reservoirs in communication with the respective ends of said cylinder, means for applying air pressure in alternate ones of said reservoirs to actuate said piston, a passageway connecting said reservoirs independently of the cylinder, a first means settable to effective and ineffective positions for controlling the flow of oil in one direction through said passageway, and a second means settable to effective and ineffective positions for controlling the flow of oil in the opposite direction through said passageway and operable when in effective position to set the first settable means in ineffective position.

3. In a hydraulic system, the combination of a cylinder, a motor piston reciprocable therein, a pair of oil reservoirs in communication with the respective ends of said cylinder, means for applying air pressure in alternate ones of said reservoirs to actuate said piston, a passageway connecting said reservoirs independently of the cylinder, a first means settable to effective and ineffective positions for controlling the flow of oil in one direction through said passageway, a second means settable to effective and ineffective positions for controlling the flow of oil in the opposite direction through said passageway and operable when in effective position to set said first settable means in ineffective position, a yielding means urging said second settable means to effective position, and means movable in response to changes in the oil level of one of said reservoirs for setting said second settable means in ineffective position.

4. In a hydraulic system, the combination of a pair of oil reservoirs in communication with each other, means for applying pressure in alternate ones of said reservoirs to effect an exchange of oil between said reservoirs, a first means settable to a position effective to prevent the flow of oil in one direction between said reservoirs and to another position in which it permits the flow of oil in said one direction, a second means settable to a position effective to prevent the flow of oil in the opposite direction between said reservoirs and to another position in which it permits the flow of oil in said opposite direction and operable when in effective position to set said first settable means in flow permitting position, a yielding means urging said second settable means to effective position, and means having a lost motion connection with said second settable means and movable in response to changes in the oil level in one of said reservoirs for actuating said second settable means.

5. In a hydraulic system, the combination of a cylinder, a motor piston reciprocable therein, a pair of oil reservoirs in communication with the respective ends of said cylinder, means for applying air pressure in alternate ones of said reservoirs to actuate said piston, a passageway connecting said reservoirs independently of the cylinder, a first means settable to effective and ineffective positions for controlling the flow of oil in one direction through said passageway, a second means settable to a plurality of positions in a first of which it prevents the flow of oil in the opposite direction through said passageway and sets said first settable means to ineffective position, and in a second of which it only sets the first said means in ineffective position, and in a third of which it is ineffective to perform either of the above functions, means movable in response to changes in the oil level in said reservoirs for moving said second means to its second and third positions, and a yielding means for moving said second settable means to its first position.

6. In a hydraulic system, the combination of a cylinder, a motor piston reciprocable therein, a pair of oil reservoirs in communication with the respective ends of said cylinder, means for applying air pressure in alternate ones of said reservoirs to actuate said piston, a passageway connecting said reservoirs independently of the cylinder, a buoyant element floating on the surface of the oil in one of said reservoirs, and means controlled by said buoyant element for controlling the flow of oil between said reservoirs, said means acting in one position of said element to prevent the flow of oil in one direction through said passageway and acting in another position of said element to permit the flow of oil in the same direction through said passageway.

7. In a hydraulic system, the combination of a cylinder, a motor piston reciprocable therein, a pair of oil reservoirs in communication with the respective ends of said cylinder, means for applying pressure in alternate ones of said reservoirs to effect an exchange of oil between said reservoirs upon movement of the piston and seepage past the piston, a passageway connecting said reservoirs independently of the cylinder, a buoyant element floating on the surface of the oil in one of said reservoirs and a valve mechanism controlled by said buoyant element comprising a valve block having limited bores in axial alignment therein, communicating means between the bores having valve seats at its opposite ends, a check valve member freely mounted in one of said bores and adapted to be opened in response to oil pressure in a first direction and to be closed by gravity, a second valve member mounted in the opposite bore and having a portion extending through the communicating means to underlie the check valve member, spring means constantly urging the second valve member to seated position, pivotally mounted lever means controlled at its outer end by the buoyant element, a stud mounted on the inner end of the lever forming a lost motion connection with the second valve member, and slot means arranged to cooperate with said stud to limit the movement of the lever, said lever being adapted upon motion in one direction in response to the elevation of the buoyant element to unseat the second valve member against the resistance of the spring means, and upon motion in the other direction in response to the lowering of the buoyant element to permit the seating of the second valve member as urged by said spring means, said lever being further adapted when in one limited position to limit the movement of the second valve member to the extent permitted by the lost motion connection.

8. A combination, according to claim 7, in which the lost motion connection comprises an aperture in the second valve member having a diameter greater than the diameter of the stud.

HOWARD R. FISCHER.
EDWARD W. STEVENS.

REFERENCES CITED

The following references are of record in the file of this patent:

UNITED STATES PATENTS

| Number | Name | Date |
| --- | --- | --- |
| 2,232,198 | Ashworth | Feb. 18, 1941 |